(12) United States Patent
Ikeda et al.

(10) Patent No.: US 6,221,267 B1
(45) Date of Patent: Apr. 24, 2001

(54) METHODS FOR MAKING SPINNABLE BALL, DISPLAY MEDIUM AND DISPLAY DEVICE

(75) Inventors: Tsutomu Ikeda, Hachiohji; Takayuki Yagi, Yokohama; Etsuro Kishi, Sagamihara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/149,069

(22) Filed: Sep. 8, 1998

(30) Foreign Application Priority Data

Sep. 11, 1997 (JP) .................................................. 9-246732
Jul. 3, 1998 (JP) ................................................ 10-188849

(51) Int. Cl.⁷ ..................................................... G09F 9/37
(52) U.S. Cl. ................................ 216/24; 216/58; 216/67; 216/83; 264/1.7; 264/313; 264/442; 427/180
(58) Field of Search .................................. 216/24, 58, 76, 216/67, 83; 264/1.7, 313, 322, 343, 442; 427/180, 197, 201, 212, 215

(56) References Cited

U.S. PATENT DOCUMENTS

| | | | |
|---|---|---|---|
| 3,222,204 | * 12/1965 | Weber et al. | 117/27 |
| 4,126,854 | 11/1978 | Sheridon | 340/373 |
| 4,143,103 | 3/1979 | Sheridon | 264/4 |
| 4,438,160 | 3/1984 | Ishikawa et al. | 427/214 |
| 4,511,210 | * 4/1985 | Tung et al. | 350/105 |
| 4,678,695 | * 7/1987 | Tung et al. | 428/120 |
| 4,725,494 | * 2/1988 | Belisle et al. | 428/325 |
| 4,898,633 | 2/1990 | Doree et al. | 156/145 |
| 5,059,262 | * 10/1991 | Calhoun et al. | 156/47 |
| 5,389,945 | 2/1995 | Sheridon | 345/85 |
| 5,777,782 | * 7/1998 | Sheridon | 359/296 |
| 5,828,431 | * 10/1998 | Ando et al. | 349/86 |
| 5,917,652 | * 6/1999 | Mathers et al. | 359/534 |

FOREIGN PATENT DOCUMENTS

| | | |
|---|---|---|
| 64-42683 | 2/1989 | (JP) . |
| 5-279486 | 10/1993 | (JP) . |
| 7-67754 | 7/1995 | (JP) . |
| 8-043849 | 2/1996 | (JP) . |

OTHER PUBLICATIONS

N.K. Sheridon, et al., "The Gyricon—A Twisting Ball Display", Proceedings of the Society for Information Display, vol. 18, Nos. 3 and 4, Third and Fourth Quarters, pp. 289–293 (1977).

M. Saitoh, et al., "A Newly Developed Electrical Twisting Ball Display", Proceedings of the Society for Information Display, vol. 23, No. 4 (1982).

* cited by examiner

*Primary Examiner*—Anita Alanko
(74) *Attorney, Agent, or Firm*—Fitzpatrick, Cella, Harper & Scinto

(57) ABSTRACT

Spinnable balls each having two surfaces with different optical characteristics can be produced by forming a plurality of balls with the same specific gravity on a thermoplastic film, and softening the thermoplastic film by controlling a heating temperature thereof based on the specific gravity of the balls so that the hemispheres of the balls are embedded into the thermoplastic film by their own weight. A layer having different optical characteristics from those of the balls is then formed on the exposed surface of each ball. Finally, the balls provided with the layers are detached from the thermoplastic film.

20 Claims, 9 Drawing Sheets

VIEWER SIDE

METHODS FOR MAKING SPINNABLE BALL, DISPLAY MEDIUM AND DISPLAY DEVICE

BACKGROUND OF THE INVENTION

1. Field of the Invention

The present invention relates to a method for making spinnable balls, a method for making a display medium and a method for making a display device.

2. Description of the Related Art

In recent years, the need for thin display devices with low electricity consumption has been increasing with the development of information devices, encouraging intensive research and development of display devices to satisfy this need. In particular, there has been intensive development of liquid crystal devices which satisfy this need, since electrical control of the arrangement of liquid crystal molecules causes a change in optical characteristics. In current liquid crystal devices, however, character visibility on a display deteriorates when the angle of vision or reflected light is inadequate. Further, flicker or low luminescence of the light source strains the eye. Energetic study of novel display devices which reduce eyestrain is now in progress.

N. K. Sheridon et al. disclosed a new type of display device that uses the twisting of fine balls driven by an electric field ("A Twisting Ball Display", Proc. of the SID, Vol. 18, No. 3/4, p. 289, 1977; U.S. Pat. Nos. 4,126,854, 4,143,103 and 5,389,945; and Japanese Patent Laid-Open No. 64-42683). The display device uses fine balls each consisting of a white hemisphere and a black hemisphere. The fine balls are placed in cavities formed on a carrier. The cavities are filled with a highly resistant liquid so that balls can rotate without restriction. Charging states of the black and white hemispheres differ from each other in a certain type of liquid, and application of an external electric field can control the spinning of the fine ball such that a white or black hemisphere faces the observation side. Display of an image is achieved in such a manner. Such a mechanical type of display system is extremely stable against temperature change and noises from electrical disturbance. Since the display can be memorized, the unchanged display does not consume electricity. Further, the display using reflection and scattering of natural light on the ball surfaces is an ideal display that can reduce eyestrain caused by flicker of the light source which is inevitable in CRT displays.

Known methods for making dichroic balls used in such a display device include a method for joining and solidifying two melted droplets having different colors in a host liquid, and a method for joining and solidifying two melted droplets having different colors by centrifugal force (Japanese Patent Publication No. 7-67754 and Japanese Patent Laid-Open No. 5-279486). The former method forms dichroic balls by solidification of a melted material in the host liquid, whereas the latter method forms dichroic balls by centrifugal solidification of a melted material.

These conventional methods, however, have the following problems. Since these balls are generally made of organic thermoplastic resins, selection of usable materials is limited. Also, selection of a usable liquid is limited, since some types of liquid will swell rotating organic colored balls.

M. Saitoh et al. disclosed another method for making colored balls used in the above-described display device in Proc. of the SID, Vol. 23/4, pp. 249–252, 1982. According to this method, fine white balls are embedded onto an adhesive layer provided on a substrate, and a black layer is formed on the exposed hemisphere of each white ball by a vacuum deposition process. M. Saitoh et al. does not mention the problem that the particle sizes of the produced balls are not equalized. Further, the black layers formed on the white hemispheres of the fine balls are not equalized.

SUMMARY OF THE INVENTION

Accordingly, it is an object of the present invention to provide a method for making spinnable balls, on which can be formed a uniform layer on the hemispheres of the fine balls, the layer having different optical characteristics from those of fine balls, even if these fine balls have different particle sizes.

Accordingly, it is an object of the present invention to provide a method for easily mass-producing colored balls composed of an inorganic material, e.g. glass or ceramic, a thermosetting resin, or a low-temperature softening resin having high chemical resistance.

It is another object of the present invention to provide a display device having improved contrast by using balls having a distinct border between a hemisphere with a layer and another hemisphere without a layer.

In accordance with the present invention, a method for making spinnable balls each consisting of two surfaces having different optical characteristics, includes the steps of: forming a plurality of balls having the same specific gravity on a thermoplastic film; softening the thermoplastic film by controlling the heating temperature of the thermoplastic film in response to the specific gravity of the balls so that the hemispheres of the balls are embedded into the thermoplastic film by their own weight; forming a layer on the exposed surface of each ball, in which the layer has different optical characteristics from these of the ball; and detaching the balls provided with the layers from the thermoplastic film.

The particle sizes of the balls may be different. The lower hemispheres of the balls are satisfactorily embedded into the thermoplastic film by their own weight regardless of uneven particle size. Since the layer is formed on the upper exposed hemisphere, a distinct boundary can be formed between the upper hemisphere provided with the layer and the lower hemisphere, resulting in a high contrast in a display device using these balls.

The step of removing the thermoplastic film by dissolution may be performed while applying ultrasonic vibration to the thermoplastic film. The ultrasonic vibration can increase the dissolution rate of the thermoplastic film, and can readily remove flashes of the deposited films adhering to the spinnable balls.

Preferably, after detaching the balls from the thermoplastic film, the balls are exposed to plasma containing ozone or oxygen to completely remove any organic material remaining on the ball surfaces. Such a cleaning process satisfactorily maintains different discharging states on the upper hemisphere and the lower hemisphere.

The method may further include a step of controlling the heating temperature of the balls in response to the specific gravity of the balls to soften the thermoplastic film. This step can suppress fluctuation of embedding time of the balls caused by a difference in heat capacity of balls having different sizes.

The step of detaching the balls from the thermoplastic film may include removing the thermoplastic film by etching in a vapor phase. A material which is not resistant to solvents or water can be used for the formation of the layer.

Another aspect of the present invention is a method for making a display medium performing display by spinning spinnable balls, each comprising two surfaces having different optical characteristics, including the above-mentioned steps for making the spinnable balls, and a step of dispersing the balls provided with the layers into a medium.

A further aspect of the present invention is a method for making a display device performing display by spinning spinnable balls each comprising two surfaces having different optical characteristics, including the above-mentioned steps for making the spinnable balls, and steps of dispersing the balls provided with the layers into a medium, and forming an electrode on the surface of the medium.

BRIEF DESCRIPTION OF THE DRAWINGS

FIGS. 1A to 1F are schematic cross-sectional views of a method for making colored balls used in Examples 1, 2, 5, 6, 7 and 8 in accordance with the present invention;

FIGS. 2A to 2G are schematic cross-sectional views of a method for making colored balls used in Example 3 in accordance with the present invention;

FIGS. 3A to 3E are schematic cross-sectional views of a method for making colored balls used in Example 4 in accordance with the present invention;

DESCRIPTION OF THE PREFERRED EMBODIMENTS

In summary, spinnable balls according to the present invention are formed by embedding the balls into thermoplastic film by their own weight. The film has been softened by heat. Uniform sedimentation of the hemisphere of each ball, regardless of size, is characteristic of the step of embedding the balls. The uniform sedimentation of the hemispheres of the balls by embedding by their own weight requires controlling the heating temperature of the film to be higher than the softening temperature of the film. For example, when the ball is composed of a high specific gravity material, such as zirconium oxide, titanium oxide, or zinc oxide, the film is heated to a temperature which is from several degrees to about ten degrees higher than the softening point of the film. In contrast, when the ball is composed of a low specific gravity material, such as glass or resin, the film is heated to a temperature which is from about ten degrees to several tens of degrees higher than the softening point. Since the softening point and the properties of the softened film vary with the method of synthesis, molecular weight, impurities, and the like even when the same material is used, the heating temperature should will depends on the circumstances of the fabrication. One skilled in the art would be able to determine the heating temperature in practice.

In general, the balls have a specific gravity which is higher than that of the film. If the heating temperature is excessively high, the balls will be completely embedded. At an adequate heating temperature, when a hemisphere of each ball is substantially embedded into the film regardless of the ball size, the sedimentation speed of the ball rapidly decreases until the sedimentation stops. Such a phenomenon is caused by the surface tension of the film having an effect on the ball. The most effective surface tension is when the hemisphere of the ball is substantially embedded. The film is cooled to fix at a state such that a hemisphere of each ball is substantially embedded into the film.

The balls constituting the display device of the present invention will now be described.

Balls used in the present invention have a diameter of several hundred $\mu$m or less. Non-limiting examples of materials for the ball include inorganic compounds, e.g. glass, alumina, mullite, titania, zirconia, and lithium oxide; and mixtures of inorganic compounds, organic compounds and metallic materials.

The film for embedding the balls is generally formed on a substrate. When a thick film is used, the substrate can be omitted. The formation of the film on the substrate may be performed by coating a film solution or a melt film onto the substrate or by laminating a film material onto the substrate by heat. Materials used for the film are thermoplastic resins which are softened by heat. Non-limiting examples of thermoplastic resins include polyvinyl alcohol (PVA), polystyrene, polypropylene, polyethylene terephthalate, and polycarbonate.

There are two methods for softening the film: (1) softening the film by heating, and (2) softening the film by heating accompanied by contact between heated balls and the heated film.

Balls may be arranged on the softened film by one of the following two methods. A first method is mere distribution of balls. Sufficient quantities of balls are distributed onto the softened film. Some balls adhere to the film. The other balls not adhered to the film are removed by gravity or air current. A single layer of balls adhered to the film is thereby formed and the balls have a random distribution. In a second method, a single layer of balls is distributed onto a substrate, heated, and then placed in contact with a film formed on another substrate so that the balls adhere to the film. In this case, the film may be heated instead of or together with the balls. This method is characterized by versatility of ball distribution on the film. A single layer of balls is distributed on the film, the balls being placed as close together as possible. This method improves the packing density per unit area of the balls over the first method.

The balls contacting the film are embedded into the film by their own weight. When the film is heated, the balls sink by their own weight. The sedimentation of the balls by their own weight is characterized in that the hemisphere of each ball spontaneously and substantially sinks into the film.

A color layer is formed on the exposed hemispherical surface of the ball. Preferred coloring materials are conductive materials for balls composed of nonconductive materials or nonconductive materials for balls composed of conductive materials. The coloring material is determined so that a high contrast is achieved between the coloring material and the ball. For example, antimony sulfide, titanium carbide, or graphite may be used together with a white titanium oxide-silicon oxide ball. When an antireflection film is formed on the color layer, the display will have a higher contrast. The method for forming the color layer is not limited. Typical examples of the methods include sputtering processes and electron beam deposition processes.

After the formation of the color layer, the balls are recovered by, for example, dissolving the film into water or a solvent. The use of ultrasonic vibration helps the dissolution of the film and can remove the excessive color layer on the balls. After dissolving the film, the balls are thoroughly cleaned, recovered and dried. The colored balls are thereby obtained. When no substrate is used or the film cannot be separated from the substrate, the film can be removed by a vapor phase process such as dry etching. In this case, coloring materials and antireflection materials that are easily soluble in or corroded by water or the solvent can be used. After removing the film, impact, such as vibration, is applied to the balls to remove excessive color layers on the balls. The colored balls are thereby obtained.

When contaminants such as organic compounds adhere to the surfaces of the colored balls, the balls are exposed to a plasma gas containing ozone or oxygen.

Figure 4:
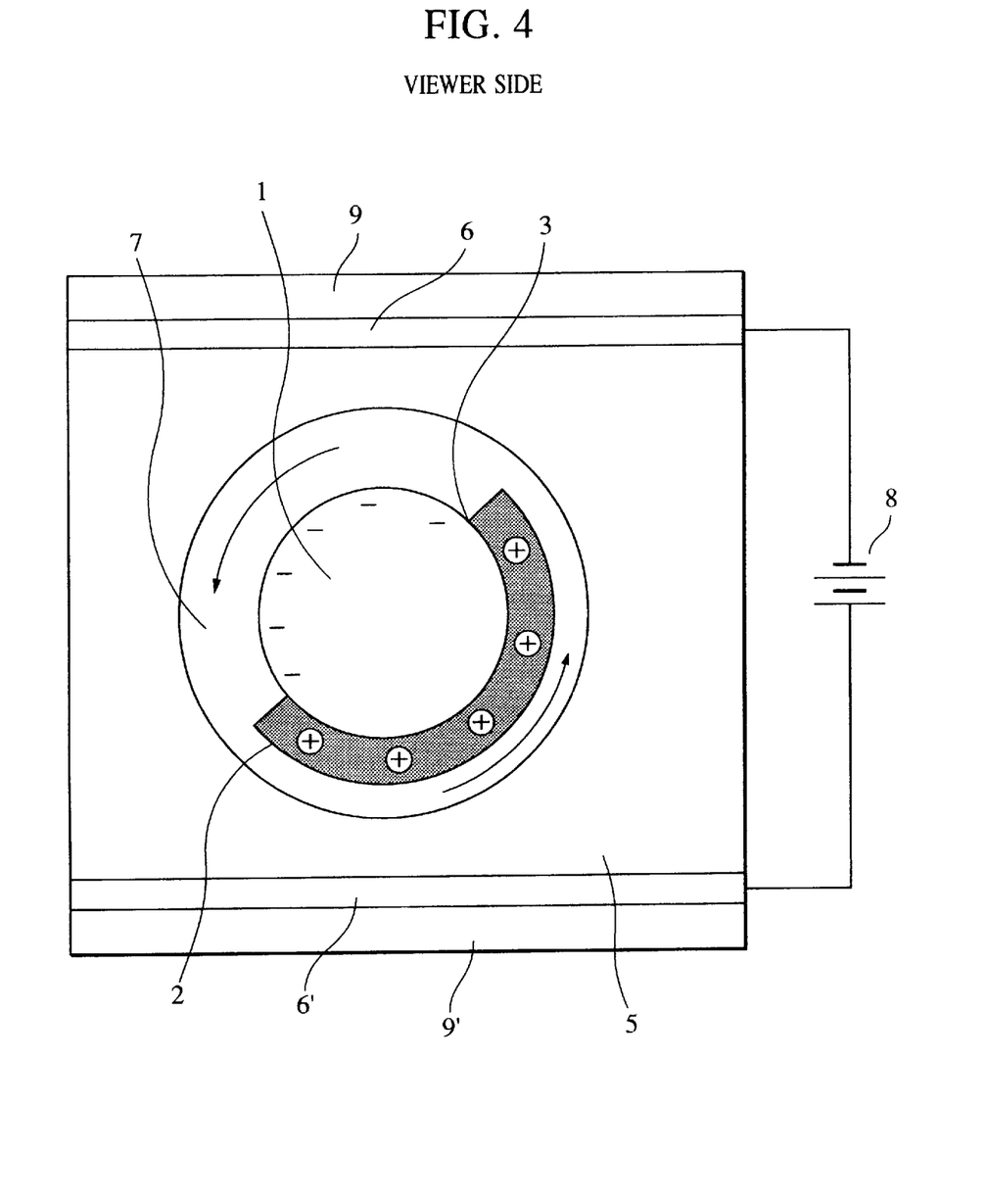
FIG. 4 is a schematic representation of an operational principle of a display device in accordance with the present invention.

The principle of the display by a colored ball 3 provided with a color layer will now be described with reference to FIG. 4. A color layer 2 is formed on a hemisphere of a fine white ball 1. When the color layer 2 of the colored ball 3 turns towards the viewer, the color is recognized because certain wavelengths of the incident natural light are absorbed in the color layer 2. On the other hand, when the white hemisphere of the colored ball 3 turns towards the viewer, white color is recognized because the white hemisphere of the ball reflects the incident natural light. It is preferable that the balls have a diameter of 200 μm or less which is smaller than the size of the pixels in the display device. The shape of the fine ball is not limited to the perfect sphere. Any fine member which can spin may be used in the present invention. Examples of available shapes other than the perfect sphere include an oval and a cylinder.

The color layer 2 has a hue which is different from that of the fine ball. The difference in hue is generated by a difference in color and intensity of the reflected light. In the present invention, a hemisphere of the fine ball 1 is covered with the color layer 2 to form two surfaces having different optical characteristics such as color and intensity of the reflected light. It is preferable that the color layer is formed of a material which is stable in an insulating liquid, has high mechanical strength, and is highly adhesive to the ball surface. The color layer can have any color, for example, yellow, magenta, cyan, or black.

An embodiment of the display device in accordance with the present invention will now be described with reference to FIG. 4. The display device has a display medium which includes fine balls which are provided with color layers 2, a carrier 5 for supporting the colored balls 3, and a cavity 7 allowing colored ball to spin. The cavity 7 is filled with an insulating liquid. The display device also has a driver unit which includes electrodes 6 and 6' formed on films 9 and 9', respectively, and an electric power source 8. The driver unit spins the colored ball so that a desired hemisphere is visible.

The principle of driving of the display device of the present invention will now be described with reference to FIG. 6. It is known that a particle in an insulating liquid is positively or negatively charged by an electrical double layer formed by charge transfer between the particle and the liquid. The surface of each colored ball 3 of the present invention has two regions composed of different materials, that is, a hemisphere having the color layer 2 and a white hemisphere. Positively or negatively charged particles in the insulating liquid absorb specifically on the surface of the colored ball 3 to generate a surface potential on the surface of the colored ball. Since the two hemispheres have different charging characteristics in the insulating liquid, a dipole moment occurs in the pole of the colored ball. When an electric field is applied to the colored ball, one hemisphere of each colored ball faces the same direction by a torque to equalize the pole of the colored ball to the direction of the electric field. When the white ball is negatively charged and the color layer is positively charged, the white hemisphere faces the positive electrode 6', whereas the color layer 2 faces the negative electrode 6. Thus, a color is observed from the viewer side of the display device in the drawing. When the electric field is reversed, the fine ball turns over so that the color layer faces the positive electrode 6'. Thus, the observer views a white color.

Figure 6:
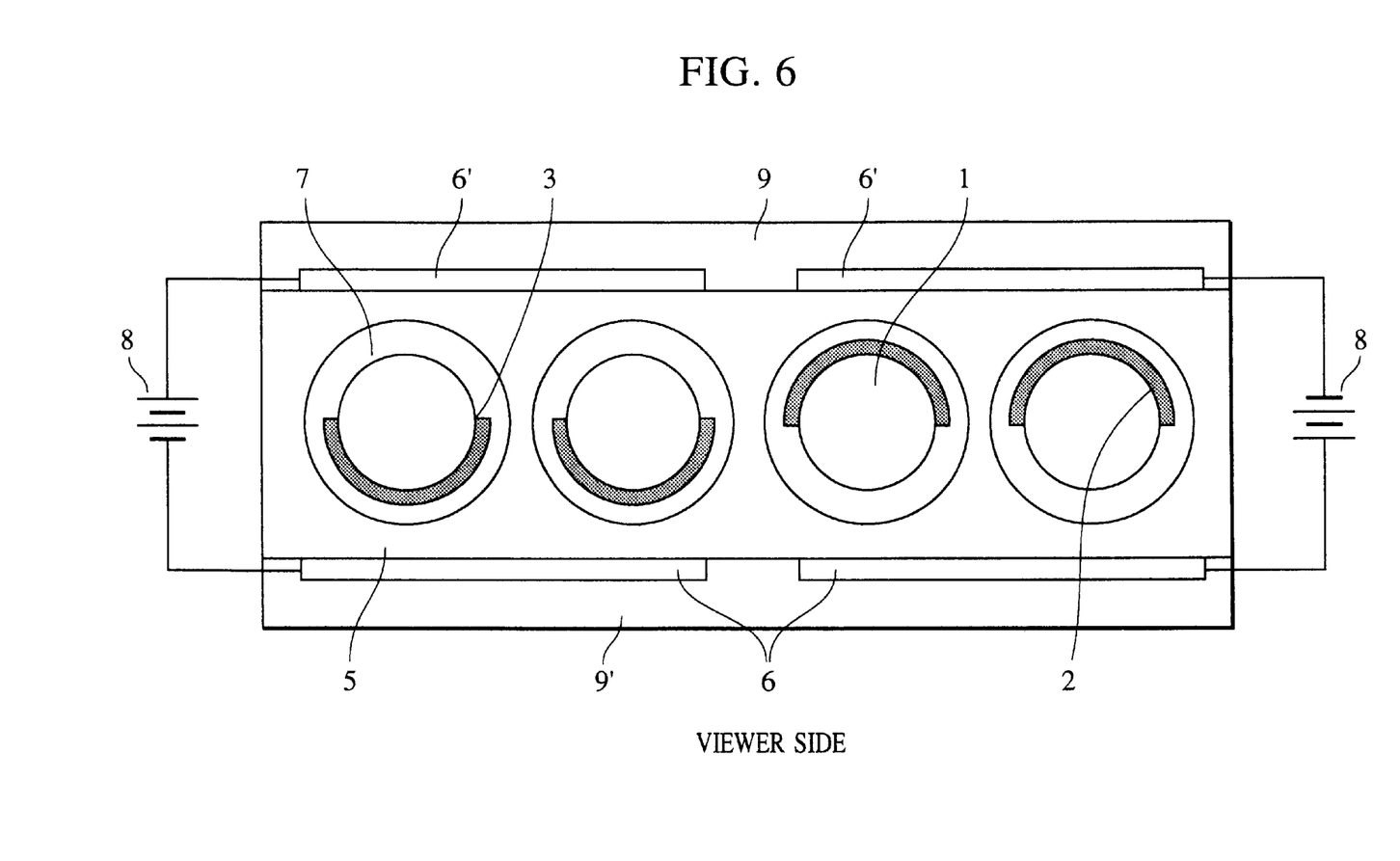
FIG. 6 is a schematic representation of an operational principle of a display device in accordance with the present invention.

As shown in FIG. 6, when a voltage is applied between the plurality of negative electrodes and plurality of positive electrodes which are provided on the upper and lower sides, respectively, of a display medium including a carrier 5 having cavities 7 containing an insulating liquid, the display can develop a color in response to the polarity of the voltage.

Any insulating liquid can be used in the present invention. Examples of usable insulating liquids include organic solvents, such as toluene and xylene. Nonvolatile liquids are preferred as the insulating liquids. Among them, transparent silicone oils are preferred since they have small ion and impurity contents, and are highly resistive. The insulating liquid also functions as a surfactant by the direct contact with the colored ball, and forms two different charging states on the surface of the colored ball.

The size of the cavity should preferably be slightly larger than the size of the colored ball to prevent the reciprocal motion of the colored ball as much as possible and to secure the memory effects of the colored ball.

Among the electrodes for driving the colored ball, the electrode at the viewer side must have light transmittance to secure the observation of the color layer on the fine ball. Thus, a transparent electrode of indium tin oxide (ITO) is used.

The carrier must be transparent so that the color layer on the fine ball is visible. Examples of preferred carriers include transparent films made of plastics, such as polyethylene and polystyrene, and glass.

The display device of the present invention by means of spinning of fine balls can be applied to receiving optics-type display devices for displaying image information including characters, graphics, and video images. The display device can also be applied to a paper display having substantially the same functions as those of paper. That is, the paper display can be read and written. Also, it can read, store, and copy an image, and delete the stored image.

Figure 5:
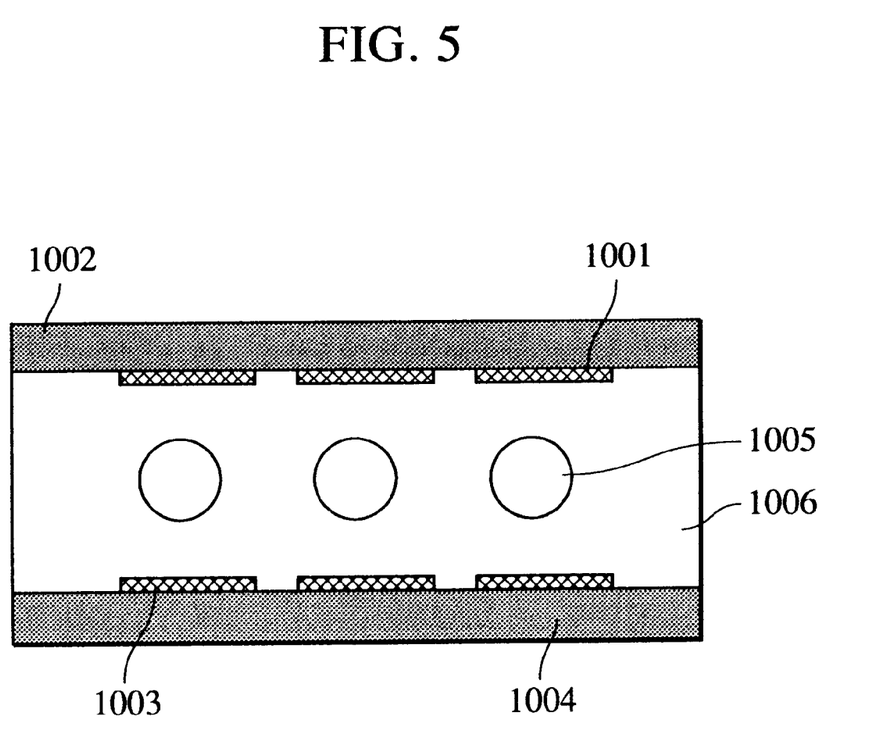
FIG. 5 is a schematic cross-sectional view of a second display device in accordance with the present invention.

A second embodiment of the display device of the present invention will now be described with reference to FIG. 5, in which only an insulating liquid intervenes between colored balls and thus no carrier is used. One hemisphere of a fine colored ball 1005 is covered with a color layer (not shown in the drawing). A first transparent substrate 1002 having a first transparent electrode 1001 and an opposing second transparent substrate 1004 having a second transparent electrode 1003 form a closed space together with sealing sections (not shown in the drawing). The closed space is filled with colored balls 1005 and an insulating liquid 1006. The colored balls 1005 are, therefore, dispersed in the insulating liquid 1006. In other words, the display medium composed of the colored balls 1005 and the insulating liquid 1006 is enclosed in the two transparent substrates each having a transparent electrode.

EXAMPLES

The present invention will now be described in detail with reference to the following Examples.

Example 1

Figure 1A:
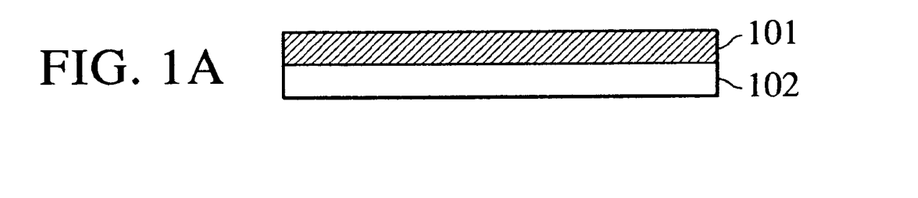
FIG. 1A shows forming a PVA film on a substrate.
Figure 1B:
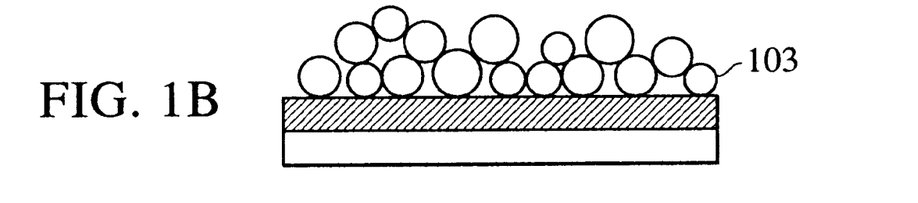
FIG. 1B shows scattering of balls on the PVA film.
Figure 1C:
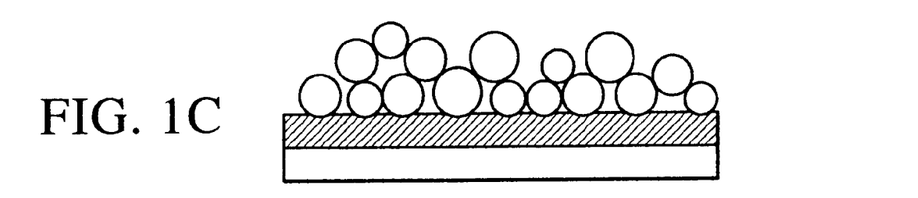
FIG. 1C shows removing excess balls.
Figure 1D:
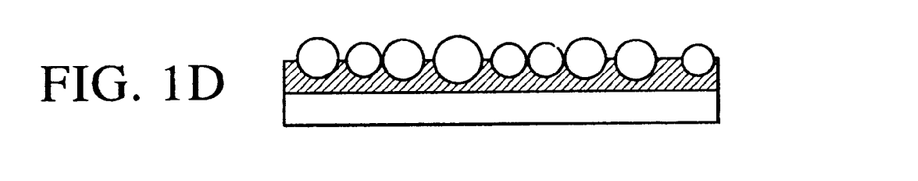
FIG. 1D shows heating to embed the balls.

FIGS. 1A to 1F are schematic cross-sectional views illustrating a process for making colored balls used in Example 1. Polyvinyl alcohol (hereinafter referred to as PVA) was dissolved into distilled water to prepare a 10% PVA solution. The solution was applied onto a substrate 102, and the substrate 102 was heated to approximately 50° C. to evaporate water. A PVA film 101 having a thickness of 50 $\mu$m was thereby formed as shown in FIG. 1A. The substrate 102 was heated on a hot plate at 200° C. to soften the PVA film 101, and then zirconia balls 103 having a diameter of approximately 60 to 80 $\mu$m and a specific gravity of approximately 5.4 were scattered on the PVA film 101 as shown in FIG. 1B. The substrate 102 was allowed to stand upright, and light shock was applied to the substrate 102 in order to remove balls 103 which had not come into contact with the PVA film 101 as shown in FIG. 1C. The hot plate was heated to a temperature of 220° C. A hemisphere of each of the balls 103 on the PVA film 101 thereby sank into the PVA film 101 by their own weight, as shown in FIG. 1D. Immediately after the sedimentation, the PVA film 101 was transferred onto a hot plate heated to 150° C. The hot plate was cooled to room temperature at a cooling rate of approximately 20° C./min.

Figure 1E:
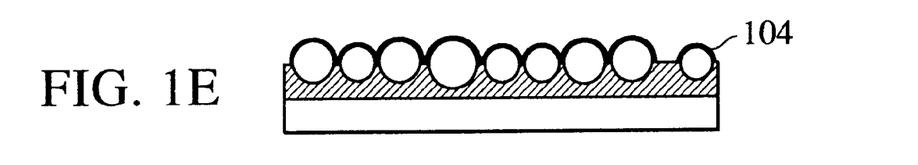
FIG. 1E shows depositing a layer on the balls.
Figure 1F:
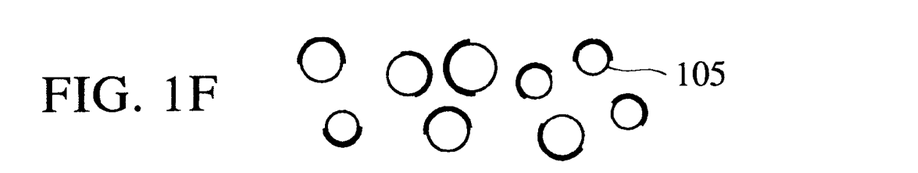
FIG. 1F shows removing balls from the substrate.

A titanium carbide layer 104 having a thickness of approximately 300 nm as a color layer 104 was formed on the PVA film 101 by a sputtering deposition process as shown in FIG. 1E. The PVA film 101 was immersed in distilled water, and ultrasonic vibration was applied in order to dissolve the PVA film 101. The solution was replaced with distilled water several times and then the resulting balls 105 were recovered and dried. The dried balls were subjected to oxygen plasma treatment to completely remove organic materials remaining on the ball surfaces as shown in FIG. 1F. The resulting balls 105 had black hemispheric layers of titanium carbide.

The process in this example has the following advantages. Since the color layer is formed on the balls, which are embedded partially on the film, the color layer and the original material can form a distinct boundary. Thus, a display device using the colored balls has a high contrast for a long time. Since the balls are embedded into the film by their own weight, a hemisphere of each ball substantially sinks into the film regardless of uneven ball size. The ultrasonic vibration accelerates the dissolution of the film and readily removes flashes of the films deposited on the balls.

When the ball surfaces are exposed to plasma containing ozone or oxygen to clean them, a distinct difference in the discharging state is ensured between the white hemisphere and the black hemisphere so as to suppress the reduction of the spinning response rate.

Example 2

A method for making colored balls of Example 2 will be described with reference to FIGS. 1A to 1F. A PVA film 101 having a thickness of 40 $\mu$m was adhered to a substrate 102 on a hot plate at approximately 200° C. and then cooled (FIG. 1A). Balls 103 composed of lithium oxide, titanium oxide and silicon oxide, having a diameter of approximately 40 to 50 $\mu$m and a specific gravity of approximately 3.6, were heated to 350° C. on a heater and scattered onto the PVA film 101 (FIG. 1B). Excess balls were removed by streams of nitrogen gas (FIG. 1C). The hot plate was heated to 230° C. so that hemispheres of the balls 103 substantially sank into the PVA film 101 by their own weight (FIG. 1D). Immediately after the sedimentation, the PVA film was transferred onto a hot plate at 150° C. The hot plate was cooled to room temperature at a cooling rate of approximately 20° C./min (FIG. 1D).

A co-deposited layer 104 of magnesium fluoride and antimony sulfide having a thickness of approximately 300 nm was formed on the PVA film 101 by a sputtering deposition process (FIG. 1E). The PVA film was immersed in distilled water and ultrasonic vibration was applied to help dissolution of the PVA film. The solution was sufficiently replaced with distilled water, and then the resulting balls 103 were recovered and dried. The dried balls were subjected to oxygen plasma treatment to completely remove organic materials remaining on the ball surfaces (FIG. 1F). The resulting colored balls 105 had black hemispheric layers of magnesium fluoride and antimony sulfide co-deposited layers and white hemispheres.

Example 3

Figure 2A:
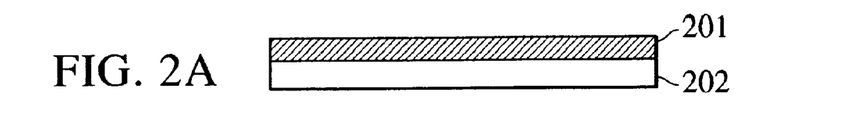
FIG. 2A shows forming a PVA film on a substrate.
Figure 2B:
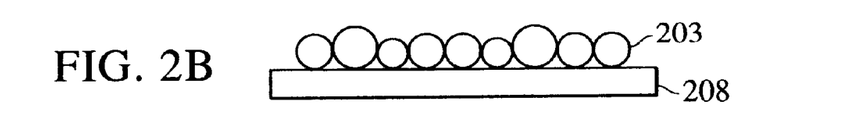
FIG. 2B shows heated balls.
Figure 2C:
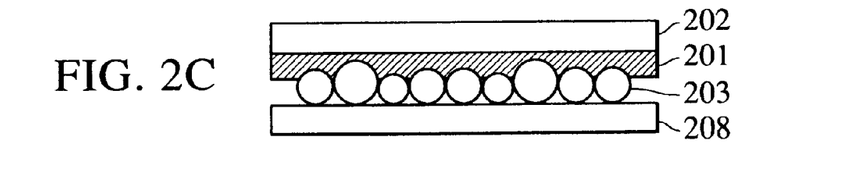
FIG. 2C shows contacting the PVA film with the balls.
Figure 2D:
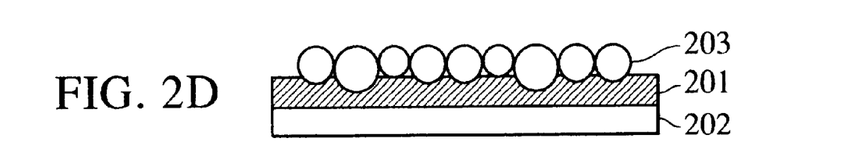
FIG. 2D shows transfer of the balls to the PVA film.
Figure 2E:
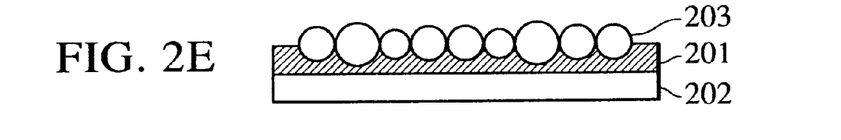
FIG. 2E shows heating to embed the balls.

FIGS. 2A to 2G are schematic cross-sectional views illustrating a process for making colored balls used in Example 3. PVA was dissolved into distilled water to prepare a 10% PVA solution. The solution was applied onto a first substrate 202 composed of a polyethylene terephthalate film, and the first substrate 202 was heated to approximately 50° C. to evaporate water. A PVA film 201 having a thickness of 50 $\mu$m was thereby formed (FIG. 2A). Zirconia balls 203 having a diameter of approximately 70 to 90 $\mu$m were the packed as closely as possible on a second substrate 208 and then heated to 180° C. (FIG. 2B). The PVA film 201 was placed in contact with the balls 203 (FIG. 2C) in order to transfer the balls 203 onto the PVA film 201 (FIG. 2D). The film 201 was heated on a hot plate at 220° C. Hemispheres of the balls 203 on the PVA film 201 thereby substantially sank into the PVA film 201 by their own weight (FIG. 2E). Immediately after the sedimentation, the PVA film 201 was transferred onto a hot plate heated to 150° C. The hot plate was cooled to room temperature at a cooling rate of approximately 20° C./min.

Figure 2F:
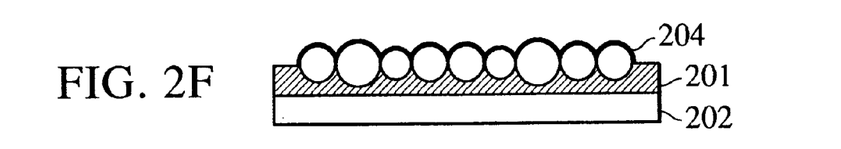
FIG. 2F shows depositing a layer on the balls.
Figure 2G:
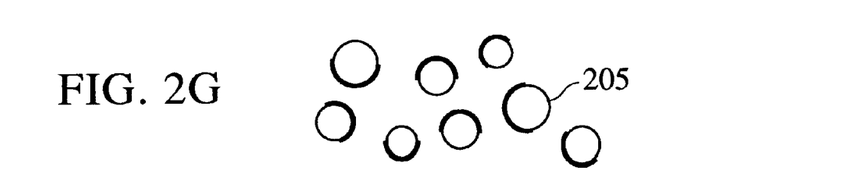
FIG. 2G shows removing balls from the substrate.

A titanium carbide layer 204 having a thickness of approximately 300 nm was formed on the PVA film 201 by a sputtering deposition process (FIG. 2F). The PVA film 201 was immersed in distilled water, and ultrasonic vibration was applied in order to dissolve the PVA film 201. The solution was sufficiently replaced with hot distilled water, and then the resulting balls 203 were recovered and dried. The dried balls were subjected to oxygen plasma treatment to completely remove organic materials remaining on the ball surfaces (FIG. 2G). The resulting balls 205 had black hemispheric layers of titanium carbide.

The closest packing of balls on the film can increase the number of colored balls per unit volume in the ball production.

Example 4

Figure 3A:
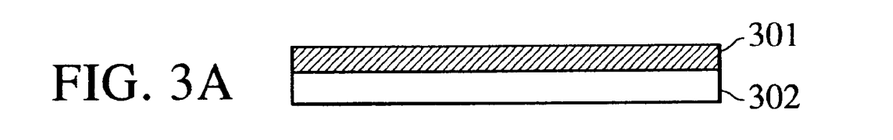
FIG. 3A shows forming a PVA film on a substrate.
Figure 3B:
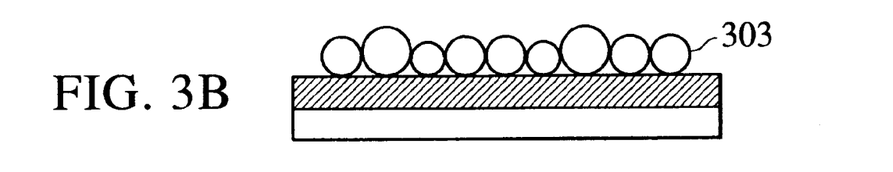
FIG. 3B shows forming balls on the PVA film.
Figure 3C:
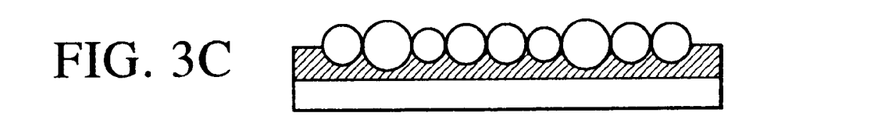
FIG. 3C shows heating to embed the balls.

FIGS. 3A to 3E are schematic cross-sectional views illustrating a process for making colored balls used in Example 4. PVA was dissolved into distilled water to prepare a 10% PVA solution. The solution was applied onto a first substrate 302 and the substrate 302 was heated to approximately 50° C. to evaporate water. A PVA film 301 having a thickness of 50 $\mu$m was thereby formed (FIG. 3A). Zirconia balls 303 having a diameter of approximately 70 to 90 $\mu$m were the packed as closely as possible on the PVA film 301 (FIG. 3B). The PVA film 301 was softened on a hot plate at 220° C. Hemispheres of the balls 303 on the PVA film 301 thereby substantially sank into the PVA film 301 by their own weight (FIG. 3C). Immediately after the sedimentation, the PVA film 301 was transferred onto a hot plate heated to 150° C. The hot plate was cooled to room temperature at a cooling rate of approximately 20° C./min.

Figure 3D:
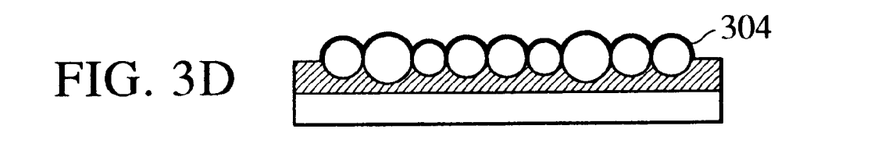
FIG. 3D shows depositing a layer on the balls.
Figure 3E:
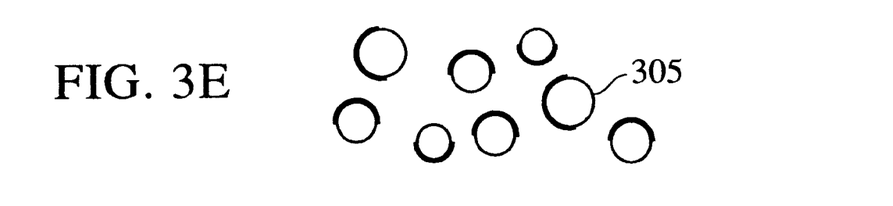
FIG. 3E shows removing balls from the substrate.

A titanium carbide layer 304 having a thickness of approximately 500 nm was formed on the PVA film 301 by a sputtering deposition process (FIG. 3D). The PVA film 301 was immersed in distilled water, and ultrasonic vibration was applied in order to dissolve the PVA film 301. The solution was sufficiently replaced with distilled water, and then the resulting balls 305 were recovered and dried. The dried balls were subjected to oxygen plasma treatment to completely remove organic materials remaining on the ball surfaces (FIG. 3E). The resulting balls 305 had black hemispheric layers of titanium carbide.

Example 5

The colored balls 105 prepared in Example 1 were dispersed into an elastomer by the above-mentioned Sheridon process to prepare a sheet display medium as follows. The colored balls were dispersed into a two-part liquid-system silicone rubber (SYLGARD 184, made by Dow Corning Corporation). The dispersion was spread onto a glass substrate so as to form a thin film having a thickness of approximately 100 $\mu$m and then heated to 100° C. for 1 hour to cure the silicon rubber. The cured rubber sheet with the colored balls was peeled off the glass substrate, and then immersed in a silicone oil having a viscosity of 1 cs (made by Toshiba Silicone Co., Ltd.) for 24 hours to swell the rubber sheet so that cavities having a gap of 5 to 10 $\mu$m form on the peripheries of the colored balls. The rubber sheet was sandwiched with glass substrates having ITO electrodes to prepare a display device. When an electric field of ±100 V was applied to the display device, titanium carbide hemispheres or original hemispheres were observed in response to the polarity of the electric field as a result of spinning the colored balls in their cavities. The response time was 50 ms or less. When an electric field was applied so that the electrode at the viewer side has a positive polarity, a white color by the untreated hemispheres was observed. When the polarity was reversed, a black color by the titanium carbide hemispheres was observed. The contrast ratio was approximately 5:1, and the visual angle was ±85° or more.

Example 6

Figure 7A:
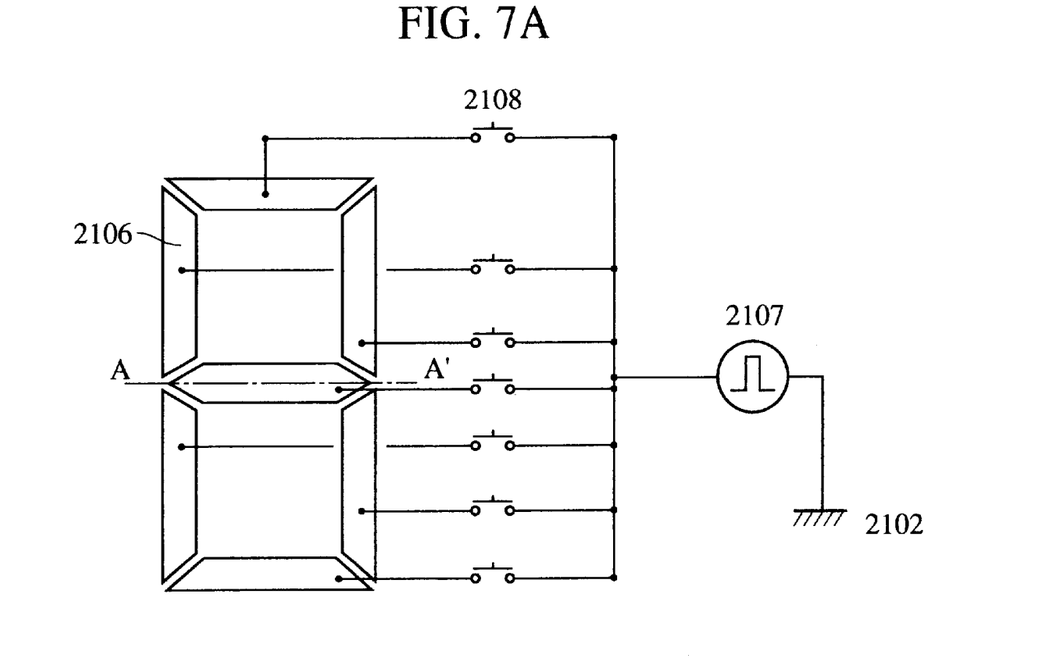
FIGS. 7A and 7B are schematic representations of a display device used in Example 6 in accordance with the present invention.
Figure 7B:
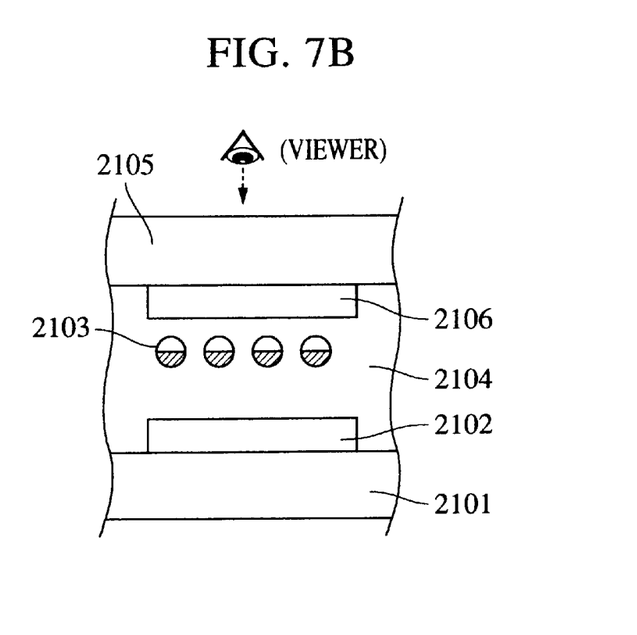

FIGS. 7A and 7B are a plan view and a cross-sectional view, respectively, for schematically illustrating a display device using the colored balls of Example 1 in accordance with the present invention. As shown in FIG. 7B, a rubber sheet 2104 with a thickness of 100 $\mu$m containing the dispersed colored balls 2103 of Example 1 was formed on a PET film 2101 having a thickness of 100 $\mu$m which was entirely covered with a transparent ITO lower electrode 2102. On the rubber sheet 2104, a PET film 2105 having a thickness of 100 $\mu$m which was provided with a transparent ITO upper electrode 2106 having a predetermined pattern was adhered so that the ITO upper electrode 2106 faces the rubber sheet 2104. Although the shape and size of the ITO upper electrode 2106 are determined in response to a desired resolution, a known 7-segment-type electrode was used in this example for simplification. As shown in FIG. 7A, the upper electrodes 2106 were connected to a pulse generator 2107, and a pulse having a pulse height of 100 V and a width of 50 ms was applied to all the electrodes to display white over the entire face. Next, some ITO upper electrodes 2106 were selected at random using switches 2108, and a pulse having the opposite polarity was applied to these ITO upper electrodes 2106. The colored balls 2103 in the segments corresponding to the selected upper electrodes 2106 were spun to display black. The results suggest that a combination of the segments can display an image, e.g. a part of an alphanumeric character. When a pulse having the opposite polarity (that is, the same polarity as that of the first pulse) was applied to the selected segments, the display changed from black to white.

Example 7

Figure 8A:
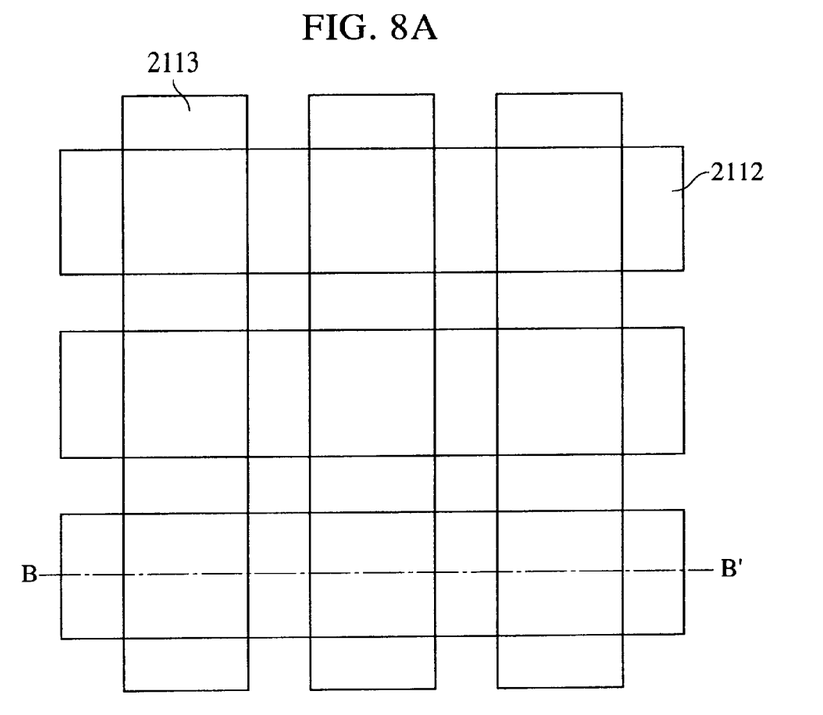
FIGS. 8A and 8B are schematic representations of a display device used in Example 7 in accordance with the present invention.
Figure 8B:
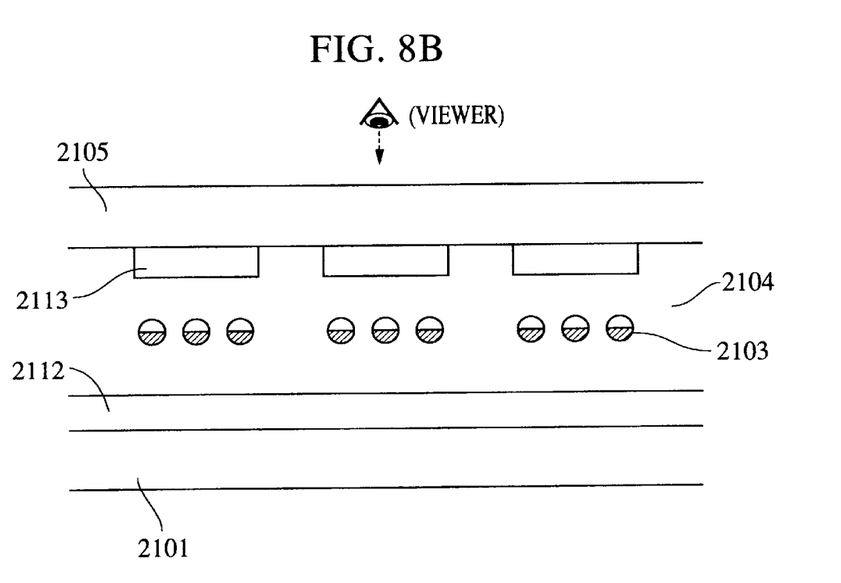

Instead of the 7-segment configuration in Example 6, a lower electrode 2112 and an upper electrode 2113 were formed of stripe ITO electrodes, as shown in FIGS. 8A and 8B. The width of each electrode and between two adjacent electrodes was 40 $\mu$m. The lower electrode 2112 and the upper electrode 2113 were arranged perpendicularly to each other, as shown in plan view in FIG. 8A. FIG. 8B is a cross-sectional view of the apparatus. A rectangular wave having a pulse height of 100 V and a width of 50 ms was applied to the lower electrodes 2112 and the upper electrodes 2113 through a pulse generator not shown in the drawing to display white over the entire face. Some lower electrodes 2112 and upper electrodes 2113 were selected at random, and a pulse having the opposite polarity was applied to these electrodes. The colored balls spun to display black at the intersections of the upper and lower electrodes. The results confirm that a black image can be displayed in a predetermined region by selecting the electrodes for applying the pulse. The region can be changed into white by applying a pulse having the opposite polarity.

Example 8

As in Example 5, a sheet display medium was prepared by dispersing the colored balls into the elastomer. In this example, transparent electrodes are not provided on the lower and upper surfaces of the display medium, that is, the electrodes 6 and 6' in FIG. 4 are not provided.

The colored balls were dispersed into the two-part liquid-system silicone rubber. The dispersion was spread onto the glass substrate to form a film with a thickness of approximately 100 μm, and the silicone rubber was cured at 100° C. for 1 hour. The rubber sheet was peeled from the glass substrate, and then immersed in a silicone oil having a viscosity of 1 cs (made by Toshiba Silicone Co., Ltd.) for 24 hours to swell the rubber sheet so that cavities form on the peripheries of the colored balls. The rubber sheet was sandwiched with PET films having a thickness of 50 μm to prepare a display medium. When an electric field was applied to the display medium from the exterior with a stylus, titanium carbide hemispheres or original hemispheres were observed in response to the polarity of the electric field as a result of spinning of the colored balls in their cavities. The response time was 200 ms or less.

Figure 9:
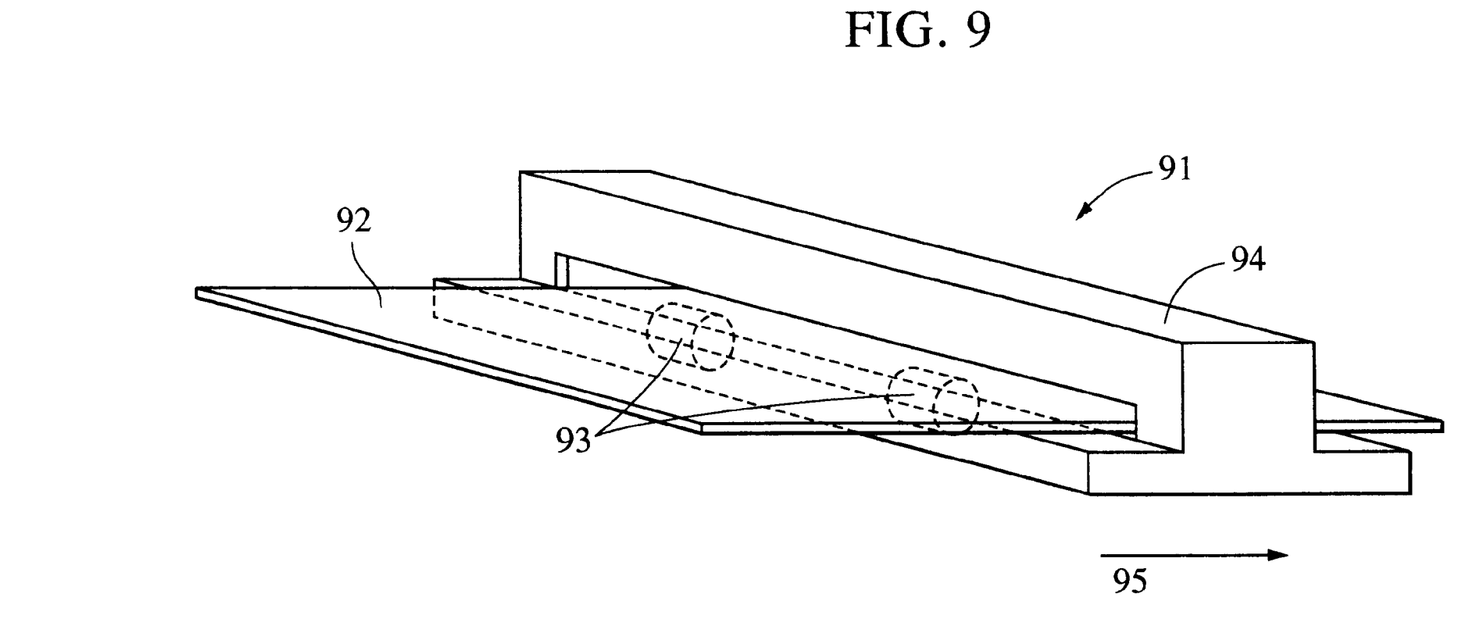
FIG. 9 is an isometric view of a stylus used in Example 8 in accordance with the present invention.

A method for recording an image on the display medium will be described with reference to FIG. 9. A stylus 91 is a device for writing image information onto a display medium 92. Roller 93 carry the display medium 92 in the direction of the arrow 95. An electric field applying means 94 in the stylus 91 applies an electric field of a given polarity to colored balls to control spinning of the colored balls. When an electric field was applied so that the electrode at the viewer side had a positive polarity and the electrode at the counter side has a negative polarity, a white color by the untreated hemispheres was observed. When the polarity was reversed, a black color by the titanium carbide hemispheres was observed. The contrast ratio was approximately 5:1, and the visual angle was ±85° or more.

The method in accordance with the present invention can be used to mass-produce colored balls with low production costs. Thus, a spinnable ball type display device can be produced with low material costs by using the colored balls, since the production cost of the colored balls occupies most of the production costs of the display device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for making spinnable balls each having two hemispheres with different optical characteristics, the method comprising the steps of:
   forming a plurality of balls having a uniform specific gravity on a thermoplastic film;
   softening the thermoplastic film by controlling a heating temperature of the thermoplastic film based on the specific gravity of the plurality of balls so that the hemispheres of the balls are embedded into the thermoplastic film by their own weight;
   forming a layer on the exposed surface of each of the plurality of balls, in which the layer has optical characteristics different from optical characteristics of the plurality of balls; and
   detaching the plurality of balls provided with the layers from the thermoplastic film, wherein
   the plurality of balls have different particle sizes from each other.

2. A method for making spinnable balls according to claim 1, further comprising a step of controlling the heating temperature of the plurality of balls based on the specific gravity of the plurality of balls so as to soften the thermoplastic film.

3. A method for making spinnable balls according to claim 1, wherein said step of detaching the plurality of balls provided with the layers from the thermoplastic film comprises removing by dissolution the thermoplastic film in a solvent.

4. A method for making spinnable balls according to claim 3, further comprising a step of applying ultrasonic vibration to the thermoplastic film while performing said step of removing by dissolution of the thermoplastic film.

5. A method for making spinnable balls according to claim 1, wherein the step of detaching the plurality of balls provided with the layers from the thermoplastic film comprises removing the thermoplastic film by etching in a vapor phase.

6. A method for making spinnable balls according to claim 1, wherein after the step of detaching the plurality of balls provided with the layers from the thermoplastic film, said method further comprises a step of exposing said plurality of balls to plasma containing one of ozone and oxygen.

7. A method for making a display medium performing display by spinning of spinnable balls each having two hemispheres with different optical characteristics, the method comprising the steps of:
   forming a plurality of balls having a uniform specific gravity on a thermoplastic film;
   softening the thermoplastic film by controlling a heating temperature of the thermoplastic film based on the specific gravity of the plurality of balls so that the hemispheres of the balls are embedded into the thermoplastic film by their own weight;
   forming a layer on the exposed surface of each of the plurality of balls, the layer having optical characteristics different from optical characteristics of the ball;
   detaching the plurality of balls provided with the layers from the thermoplastic film; and
   dispersing the plurality of balls provided with the layers into a medium, wherein
   the plurality of balls have different particle sizes from each other.

8. A method for making a display medium according to claim 7, further comprising a step of softening the thermoplastic film by controlling the heating temperature of the plurality of balls based on the specific gravity of the plurality of balls.

9. A method for making a display medium according to claim 7, wherein the step of detaching the plurality of balls provided with the layers from the thermoplastic film comprises removing by dissolution the thermoplastic film in a solvent.

10. A method for making a display medium according to claim 9, wherein the step of removing by dissolution of the thermoplastic film is performed while applying ultrasonic vibration to the thermoplastic film.

11. A method for making a display medium according to claim 7, wherein the step of detaching the plurality of balls provided with the layers from the thermoplastic film comprises removing the thermoplastic film by etching in a vapor phase.

12. A method for making a display medium according to claim 7, wherein after the step of detaching the plurality of balls provided with the layers from the thermoplastic film, said method further comprises a step of exposing said plurality of balls to plasma containing one of ozone and oxygen.

13. A method for making a display device performing display by spinning spinnable balls each having two surfaces with different optical characteristics, comprising the steps of:

forming a plurality of balls having a uniform specific gravity on a thermoplastic film;

softening the thermoplastic film by controlling a heating temperature of the thermoplastic film based on the specific gravity of the plurality of balls so that the hemispheres of the plurality of balls are embedded into the thermoplastic film by their own weight;

forming a layer on the exposed surface of each of the plurality of balls, the layer having optical characteristics different from optical characteristics of the ball;

detaching the plurality of balls provided with the layers from the thermoplastic film;

dispersing the plurality of balls provided with the layers into a medium; and forming an electrode on the surface of the medium, wherein the plurality of balls have different particle sizes from each other.

14. A method for making a display device according to claim 13, further comprising the step of softening the thermoplastic film by controlling the heating temperature of the plurality of balls based on the specific gravity of the plurality of balls.

15. A method for making a display device according to claim 13, wherein said step of detaching the plurality of balls provided with the layers from the thermoplastic film comprises removing the dissolution the thermoplastic film in a solvent.

16. A method for making a display device according to claim 15, wherein said step of removing by dissolution of the thermoplastic film is performed while applying ultrasonic vibration to the thermoplastic film.

17. A method for making a display device according to claim 13, wherein said step of detaching the plurality of balls provided with the layers from the thermoplastic film comprises removing the thermoplastic film by etching in a vapor phase.

18. A method for making a display device according to claim 13, wherein after said step of detaching the plurality of balls provided with the layers from the thermoplastic film, said method further comprises a step of exposing the plurality of balls to plasma containing one of ozone and oxygen.

19. A method for making a display medium according to claim 7, further comprising the step of dispersing each ball in a cavity and further providing a driver unit capable of spinning the balls within their respective cavities.

20. A method for making a display device according to claim 13, further comprising the step of dispersing each ball in a cavity and further providing a driver unit capable of spinning the balls within their respective cavities.

* * * * *

UNITED STATES PATENT AND TRADEMARK OFFICE
CERTIFICATE OF CORRECTION

PATENT NO.    : 6,221,267 B1
DATED         : April 24, 2001
INVENTOR(S)   : Tsutomu Ikeda et al.

It is certified that error appears in the above-identified patent and that said Letters Patent is hereby corrected as shown below:

<u>Column 8,</u>
Line 55, "the" should read -- then --.

Signed and Sealed this

Second Day of December, 2003

JAMES E. ROGAN
*Director of the United States Patent and Trademark Office*